United States Patent
Cheng

(10) Patent No.: US 8,934,730 B2
(45) Date of Patent: Jan. 13, 2015

(54) IMAGE EDITING METHOD AND ASSOCIATED METHOD FOR ESTABLISHING BLUR PARAMETER

(71) Applicant: MStar Semiconductor, Inc., Hsinchu Hsien (TW)

(72) Inventor: Kun-Nan Cheng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 110 days.

(21) Appl. No.: 13/747,680

(22) Filed: Jan. 23, 2013

(65) Prior Publication Data

US 2013/0272625 A1 Oct. 17, 2013

(30) Foreign Application Priority Data

Apr. 17, 2012 (TW) .............................. 101113670 A

(51) Int. Cl.
  *G06K 9/40* (2006.01)
  *G06T 5/00* (2006.01)
  *G06T 5/50* (2006.01)

(52) U.S. Cl.
  CPC . *G06K 9/40* (2013.01); *G06T 5/002* (2013.01); *G06T 5/003* (2013.01); *G06T 5/50* (2013.01)
  USPC .......................................... 382/254; 382/255

(58) Field of Classification Search
  None
  See application file for complete search history.

(56) References Cited

U.S. PATENT DOCUMENTS

| | | | |
|---|---|---|---|
| 6,900,841 B1 * | 5/2005 | Mihara | 348/345 |
| 8,218,061 B2 * | 7/2012 | Baxansky | 348/345 |
| 2011/0229052 A1 * | 9/2011 | Li et al. | 382/264 |
| 2012/0162379 A1 * | 6/2012 | Dahi et al. | 348/47 |
| 2012/0242867 A1 * | 9/2012 | Shuster | 348/240.2 |
| 2012/0249836 A1 * | 10/2012 | Ali et al. | 348/239 |
| 2012/0293690 A1 * | 11/2012 | Lin | 348/239 |
| 2013/0194290 A1 * | 8/2013 | Hamano | 345/581 |
| 2013/0208093 A1 * | 8/2013 | Sun et al. | 348/46 |

FOREIGN PATENT DOCUMENTS

TW    I314832    9/2009

* cited by examiner

*Primary Examiner* — Li Liu

(74) *Attorney, Agent, or Firm* — Edell, Shapiro & Finnan, LLC

(57) ABSTRACT

An image editing method for editing an original image is provided. The original image includes at least a first object and a second object. The method includes steps of: obtaining a first distance between the first object and a lens; obtaining a second distance between the second object and the lens; obtaining a blur matrix set according to the first distance and an optical parameter; obtaining a first blur matrix from the blur matrix set according to the second distance; and performing a blur process on the second object according to the first blur matrix to generate a blurred second object, and generating a simulated image from the first object and the blurred second object.

20 Claims, 13 Drawing Sheets

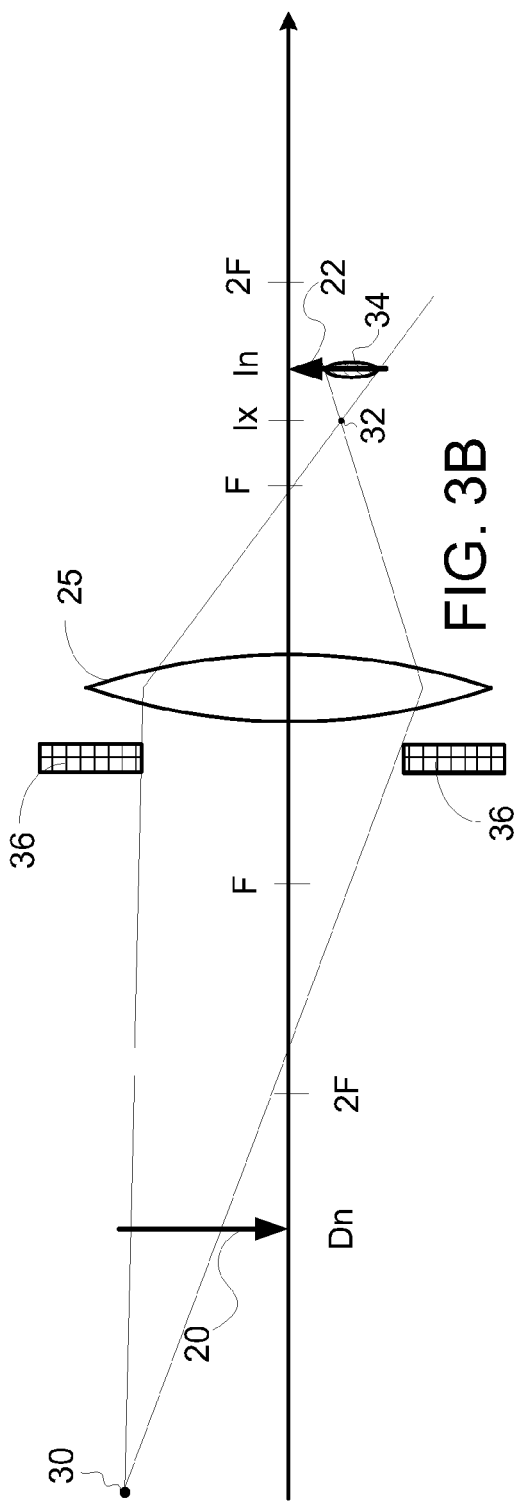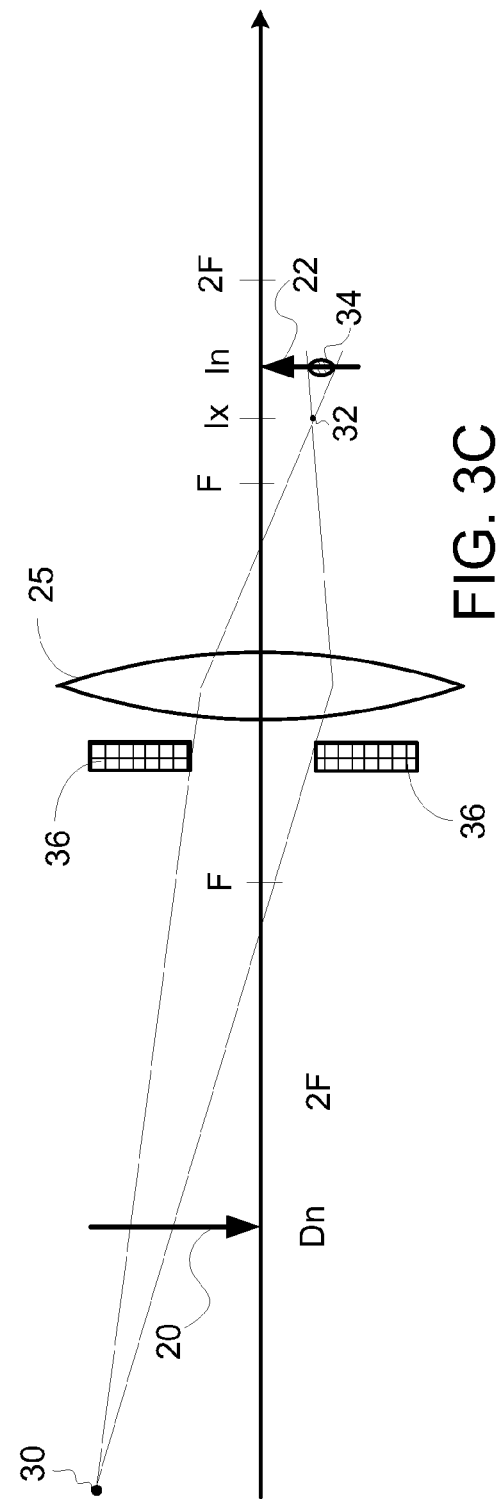

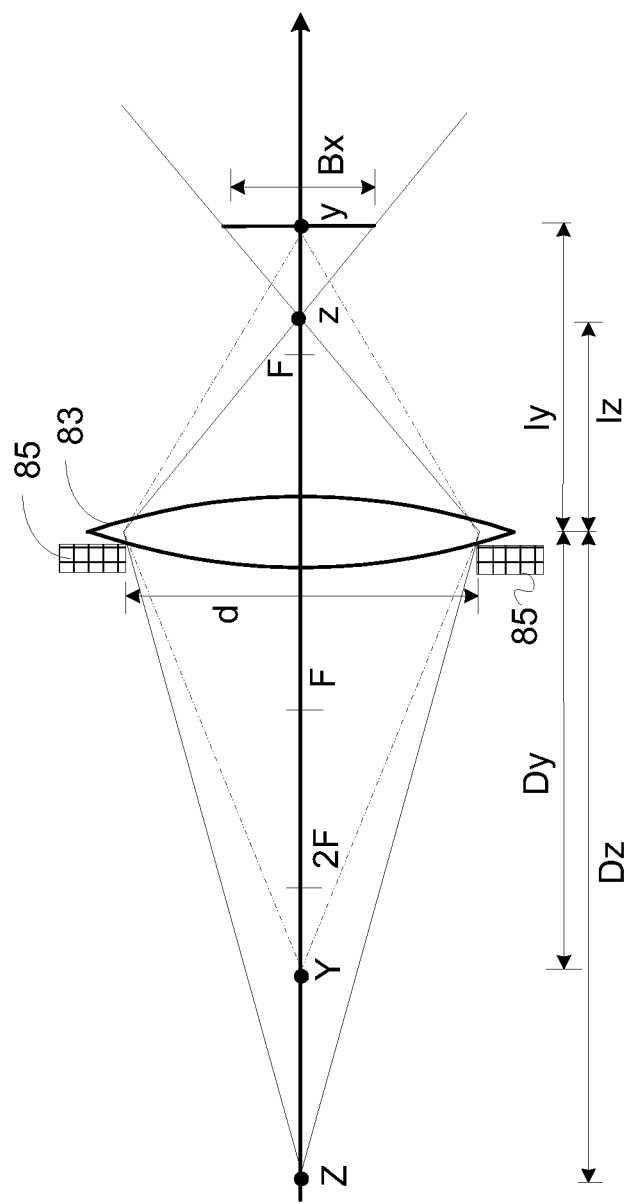

$H_{M1-N1-O1} =$ $$\frac{1}{41}\begin{bmatrix} 0 & 1 & 2 & 1 & 0 \\ 1 & 2 & 3 & 2 & 1 \\ 2 & 3 & 5 & 3 & 2 \\ 1 & 2 & 3 & 2 & 1 \\ 0 & 1 & 2 & 1 & 0 \end{bmatrix}$$

FIG. 9A $H_{M1-N1-O2} =$ $$\frac{1}{25}\begin{bmatrix} 0 & 0 & 1 & 0 & 0 \\ 0 & 2 & 2 & 2 & 0 \\ 1 & 2 & 5 & 2 & 1 \\ 0 & 2 & 2 & 2 & 0 \\ 0 & 0 & 1 & 0 & 0 \end{bmatrix}$$

FIG. 9B $H_{M1-N1-O3} =$ $$\frac{1}{17}\begin{bmatrix} 0 & 0 & 0 & 0 & 0 \\ 0 & 1 & 2 & 1 & 0 \\ 0 & 2 & 5 & 2 & 0 \\ 0 & 1 & 2 & 1 & 0 \\ 0 & 0 & 0 & 0 & 0 \end{bmatrix}$$

FIG. 9C $H_{M1-N1-O4} =$ $$\frac{1}{9}\begin{bmatrix} 0 & 0 & 0 & 0 & 0 \\ 0 & 0 & 1 & 0 & 0 \\ 0 & 1 & 5 & 1 & 0 \\ 0 & 0 & 1 & 0 & 0 \\ 0 & 0 & 0 & 0 & 0 \end{bmatrix}$$

FIG. 9D

IMAGE EDITING METHOD AND ASSOCIATED METHOD FOR ESTABLISHING BLUR PARAMETER

This application claims the benefit of Taiwan application Serial No. 101113670, filed Apr. 17, 2012, the subject matter of which is incorporated herein by reference.

BACKGROUND OF THE INVENTION

1. Field of the Invention

The invention relates in general to an image editing method, and more particularly to a method for converting an original image to a simulated image satisfying a lens optical characteristic through distances between objects in the original image and a capturing lens.

2. Description of the Related Art

As image capturing techniques rapidly develop, digital cameras are now indispensible electronic apparatuses in modern daily life. To handily operate a digital camera, a common consumer camera (e.g., a point-and-shoot camera or a camera equipped in a cell phone) is provided with a greater field of depth for easily capturing clear images.

A professional camera (e.g., single-lens reflex (SLR) camera), featuring a large aperture and a small field of depth, is preferably operated by a user with good photographing skills. Images captured by an SLR camera show better layering effects and thus more professional photographing results, which cannot be rendered by a common consumer camera.

To simulate a photographing result of another type of camera, certain consumer cameras, cell phones or computers carry an image processing module for simulating a photographing result of another type of camera. In other words, a photographing result of a professional camera can be achieved by an image captured by a consumer camera through image processing. For example, the image processing module is implemented by a hardware circuit or software.

In principle, in a conventional image processing method, a focal object in an image is selected, and a blur process is performed on parts of the image except the focal object. FIGS. 1A to 1C show schematic diagrams of a conventional image simulating method. For example, an image captured by a consumer camera is as shown in FIG. 1A. In contribution to a greater field of depth of a consumer camera, various objects in the image are clearly presented.

To further process the image, the user may select any object in the image as a focal object. Referring to FIG. 1B, the user may select an automobile as a focal object using a selection frame 10. The focal object in the selection frame 10 is kept clear while parts outside (dotted regions) the selection frame 10 undergo a blur process. After processing the image, the focal object appears clear whereas other parts except the focal object appear more blurry, thus rendering layering effects similar to those provided by a professional camera.

Similarly, referring to FIG. 1C, after selecting flowers in the image as a focal object, the image processing module keeps the focal object in the selection frame 10 clear and performs a blur process on the parts outside (dotted regions) the selection frame. After processing the image, the focal object appears clear whereas other parts except the focal object appear more blurry, thus rendering layering effects similar to those provided by a professional camera.

A conventional image processing module generally performs a blur process using information of an original image. In other words, a conventional image processing module, regarding the selection frame 10 (the focal object) as a center, processes objects farther away from the selection frame 10 with higher blur levels and processes objects closer to the selection frame 10 with lower blur levels. Taking FIG. 1B for example, regions with a higher density of the dotted lines appear more blurry than regions with a lower density of the dotted lines. That is to say, in FIG. 1B, peripheral areas of the rectangular image are located farthest away from the selection frame 10 and hence have more blurry images. Taking FIG. 1C for example, an upper-left corner of the rectangular image is farthest away from the selection frame 10 and thus has the more blurry images.

Although with the above image processing, an image obtained by the conventional image processing through simulating a professional camera is nevertheless noticeably different from an image actually captured by a professional camera—information obtained after performing a blur process on a captured image in fact does not match an actual condition. Therefore, there is a need for an image processing method for more realistically simulating a photographing result of another camera.

SUMMARY OF THE INVENTION

The invention is directed to a method for editing and simulating an original image to an image captured by another camera by using distances between objects in the original image and a capturing lens.

The present invention relates to an image editing method for editing an original image at least including a first object and a second object. The image editing method includes steps of: obtaining a first distance between the first object and a lens; obtaining a second distance between the second object and the lens; obtaining a blur matrix set according to the first distance and an optical parameter; obtaining a first blur matrix from the blur matrix set according to the second distance; and performing a burring process on the second object according to the first blur matrix to generate a blurred second object, and generating a simulated image from the first object and the second object.

The present invention relates to an image simulating method for converting an original image to a simulated image matching an optical characteristic of a lens. The image simulating method includes a step of: adjusting a conversion characteristic between the original image and the simulated image according to a change in a distance between an object and the lens, a relative distance between the object and a focal point of the lens, an aperture value of the lens, or a focal point of the lens.

The present invention further relates to a method for establishing a blurring parameter. The blurring parameter is suitable for converting an original image into a simulated image satisfying an optical characteristic of a lens. The method includes steps of: a) providing a first object and a second object at different positions in front of the lens; b) focusing the first object with a focal length between the lens and the first object; c) changing the position of the second object for a plurality of times, and recording an image diffusion level of the second object at each of the positions to obtain a blur matrix; d) moving the first object and re-focusing the first object with another focal length, and repeating step (c); and e) repeating step (d) for a plurality of times to generate a plurality of blur matrix sets respectively corresponding to different focal lengths, wherein each of the blur matrix sets includes a plurality of blur matrices.

The above and other aspects of the invention will become better understood with regard to the following detailed

BRIEF DESCRIPTION OF THE DRAWINGS

FIGS. 3A to 3C depict principles of generating bokeh by a camera.

FIG. 8 shows details of editing an original image according to a first embodiment of the present invention.

FIGS. 9A to 9D are schematic diagrams of changes in a diffusion level of an out-of-focus formed image on an optical sensor due to a point light source moving from far to near.

DETAILED DESCRIPTION OF THE INVENTION

Simple geometrical optics are described below for introducing image formation principles of a camera and associated effects on a focal object.

Figure 1A:
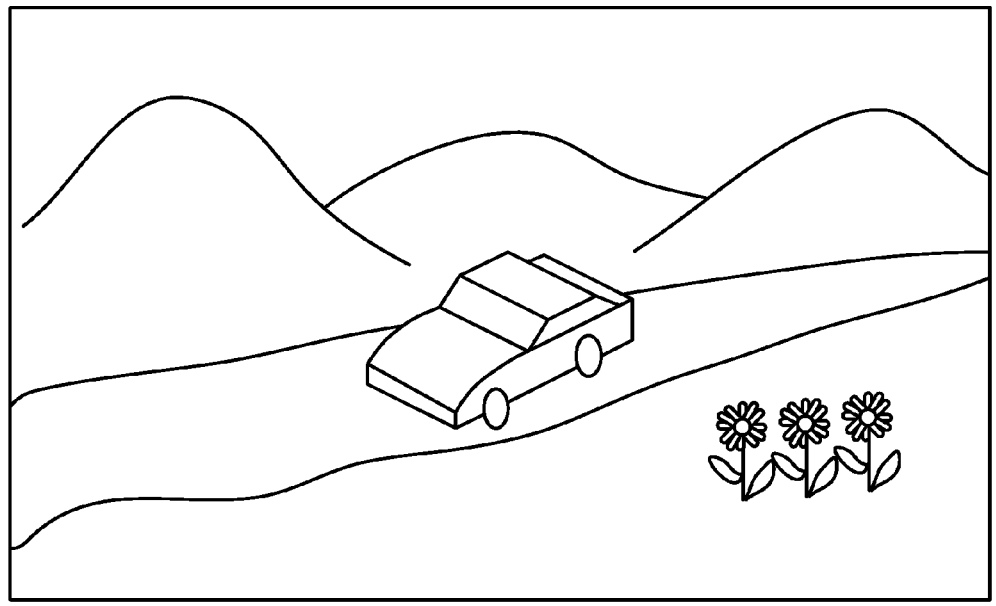
FIG. 1A to FIG. 1C are schematic diagram of a conventional image simulating method.
Figure 1B:
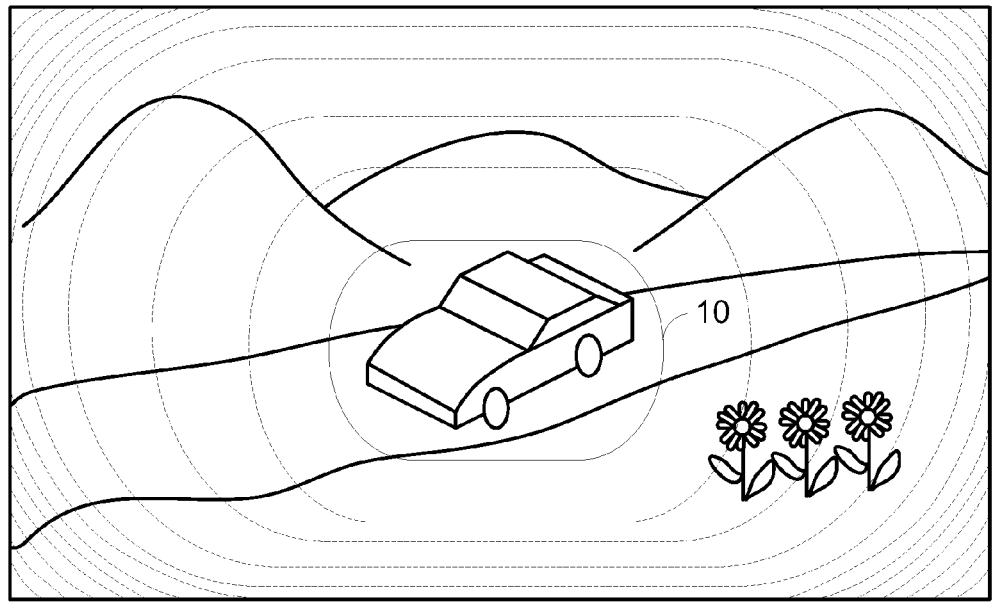
Figure 1C:
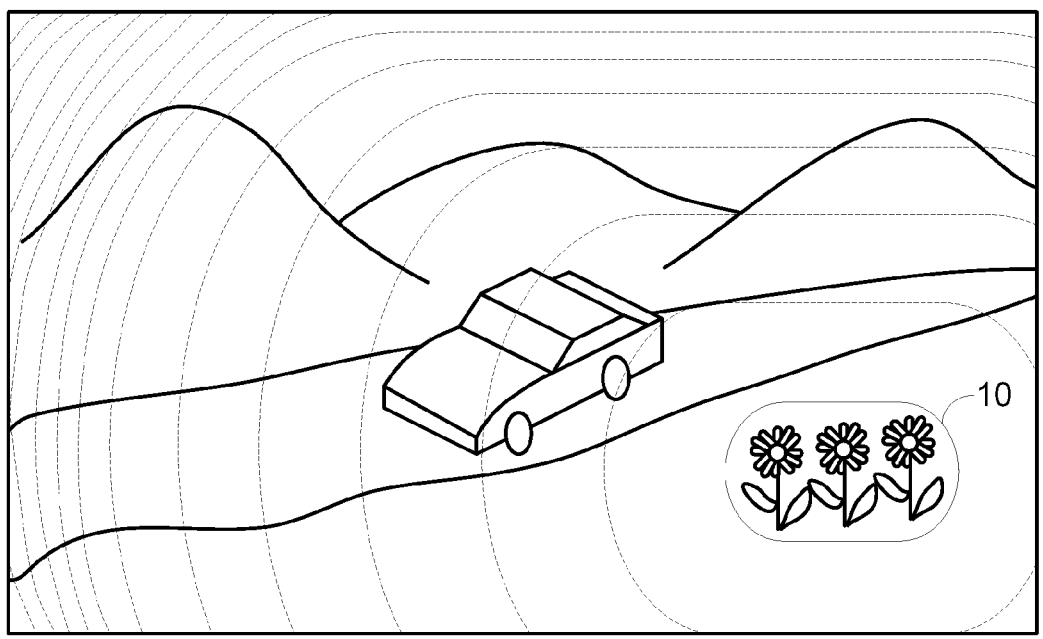
Figure 2:
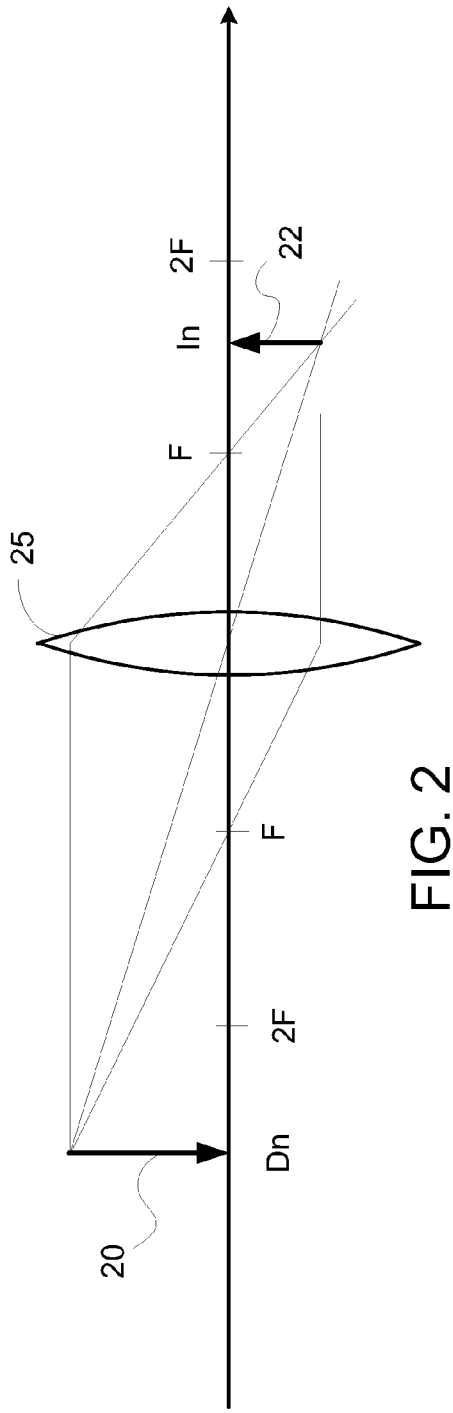
FIG. 2 is an image formation principle of a camera.

FIG. 2 shows an imaging principle of a camera. A capturing lens 25 has a focal length F, and a focal object 20 is located at a distance outside the range of twice of the focal length (2F) at a first side of the capturing lens 25. It is observed that a smaller real image 22 is formed at a point between the focal length (1F) and the twice of the focal length (2F) at a second side of the capturing lens 25. In other words, a clear image of the focal object 20 can be obtained by moving an optical sensor of the camera to a position of the real image 22 at the second side of the capturing lens.

Assuming that the focal length of the capturing lens 25 is F, a distance between the focal object 20 and the capturing lens 25 is Dn, and a distance between the real image 22 and the capturing lens 25 is In, the above relations needs to satisfy a Lensmaker's equations, i.e., $(1/Dn)+(1/In)=(1/F)$.

More specifically, when the focal object 20 is located outside the range of twice of the focal length (2F) at the first side of the capturing lens 25, as the focal object 20 gets farther away from the capturing lens 25, the position of the real image 22 at the second side of the capturing lens 25 becomes closer to one focal length (F) and the real image 22 becomes smaller. On the other hand, when the focal object 20 is located outside twice of the focal length (2F) at the first side of the capturing lens 25, as the focal object 20 gets closer to twice of the focal length (2F), the position of the real image 22 at the second side of the capturing lens 25 becomes closer to twice of the focal length (2F) and the real image 22 becomes larger.

According to the above principle, in a focusing process of a camera, given that distance between the focal object 20 and the capturing lens 25 is determined, the correct imaging position In of the real image 22 can be deduced according to the focal length of the capturing camera 25. Thus, the real image 22 of the focal object 20 can be obtained by moving the optical sensor in the camera to the position 'In'.

Certain cameras can produce an image having bokeh, which is formed in out-of-focus areas in the image. Since a capturing lens of a camera focuses on a focal object to form an image on an optical sensor, the image of the focal object formed on the optical sensor is the most clear. Other out-of-focus objects also have images formed on the optical sensor—such images formed from the out-of-focus objects on the optical sensor are referred to as bokeh.

Figure 3A:
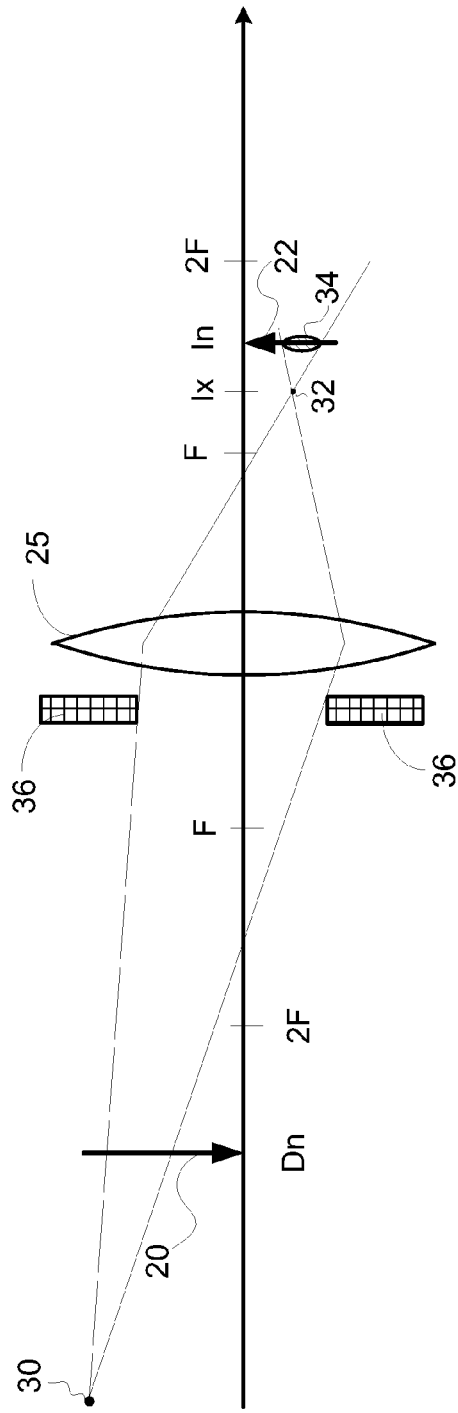

FIG. 3A shows how a camera generates bokeh. As shown in FIG. 3A, the focal object 20 is located at the first side of the capturing lens 25, a point object 30 is located even farther away than the focal object 20 from the capturing lens 25, and the real image 22 of the focal object 20 is formed at the position 'In' at the second side of the capturing lens 25. Similarly, with effects of an aperture 36 and the capturing lens 25, the point object 30 forms into a real image at a position 'ix' at the second side of the capturing lens 25, with 'Ix'<'In'. At this point, the optical sensor is at the position 'In' rather than the position 'Ix'. Hence, the formed image of the point object 30 is projected onto the optical sensor and forms a blurry and diffused out-of-focus image 34, which results the bokeh.

Apparently, as the point object 30 gets farther away from the focal object 20, the position 'Ix' of the real image of the point object 30 becomes closer to the focal point F, such that the out-of-focus formed image 34 becomes more diffused such that it projects a larger area on the optical sensor. Based on the law of conservation of energy, the out-of-focus formed image 34 has the same amount of energy. That is to say, the smaller the area of the out-of-focus formed image 34 on the optical sensor gets, the better the brightness, clarity and contrast of the out-of-focus formed image 34 become. Conversely, the larger the area of the out-of-focus formed image 34 on the optical sensor gets, the poorer the brightness, clarity and contrast of the out-of-focus formed image 34 will be.

In this embodiment, a diameter and a size (also referred to as an aperture value) of the aperture 36 of the lens 25 also affects the area of the out-of-focus formed image 34 on the optical sensor. Compared to FIG. 3A, as the diameter of the aperture 36 increases, the area of the out-of-focus formed image 34 project on the optical sensor becomes larger, as shown in FIG. 3B. Conversely, the area of the out-of-focus formed image 34 on the optical sensor becomes smaller as the diameter of the aperture 36 reduces.

It is seen from FIGS. 3A to 3C that the area of the out-of-focus formed image 34 becomes smaller which results in less bokeh as the diameter of the aperture 36 reduces, and the area of the out-of-focus formed image 34 becomes larger which results in more bokeh as the diameter of the aperture 36 increases. Further, a shape (a blade shape and a number) of the aperture 36 also affects characteristics of the out-of-focus formed image 34.

Figure 4:
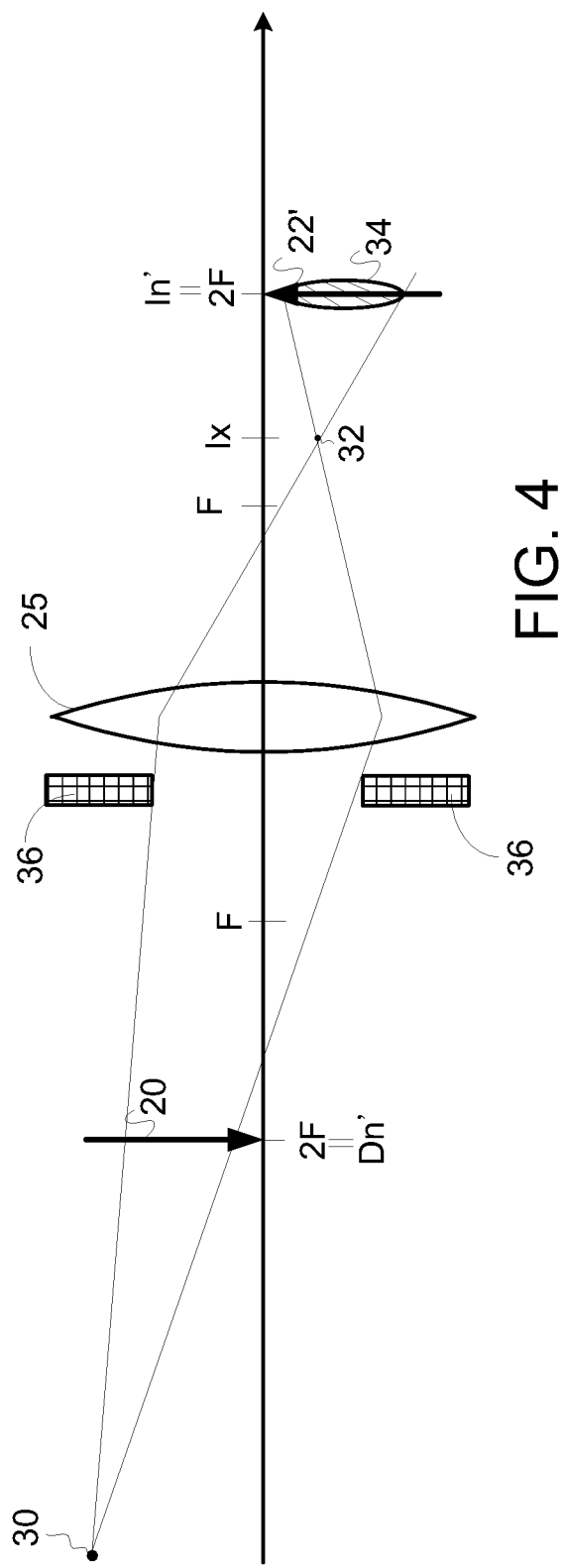
FIG. 4 is a schematic diagram of an effect that a distance between a focal object and a capturing lens imposes on bokeh.

FIG. 4 shows a schematic diagram to show how the distance between a focal object and a capturing lens changes bokeh. Assume that the positions of the capturing lens 25, the point object 30 and the aperture 36 are identical to those in FIG. 3A. The only difference is that the position of the focal object 20 is moved from the position Dn (in FIG. 3A) which is outside the range of twice of the focal length at the first side of the capturing lens 25, to a position Dn' that is at the point of twice of the focal length (i.e., Dn'=2F).

As shown in FIG. 4, the imaging position of the focal object is at a position In' (In'=2F) at the second side of the capturing lens 25, and the optical sensor at this point obtains a clear real image 22' at the position In'. Compared to FIG. 3A, the point object 30 forms an image which has a greater area on the optical sensor than the out-of-focus formed image 34. Thus, it is known from the comparison between FIG. 3A and FIG. 4 that, when the focal object 20 gets closer to the capturing lens 25, bokeh becomes more apparent as the field of depth decreases.

Figure 5A:
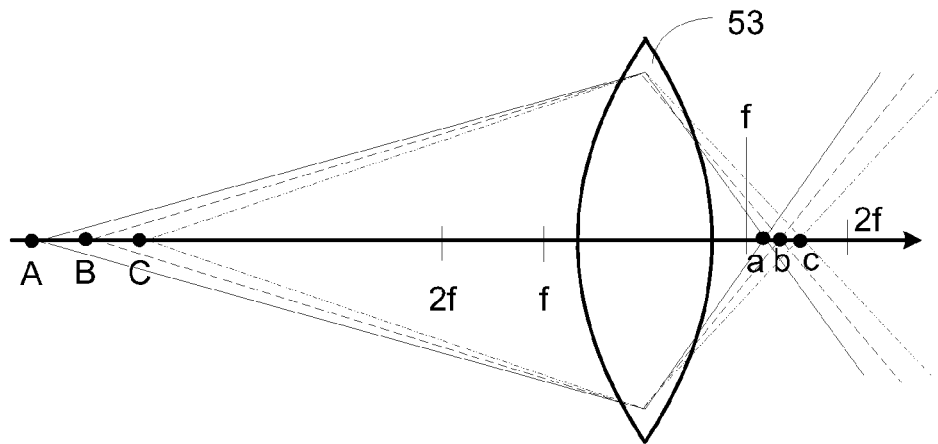
FIGS. 5A and 5B show relations between a focal length of a capturing camera and bokeh.
Figure 5B:
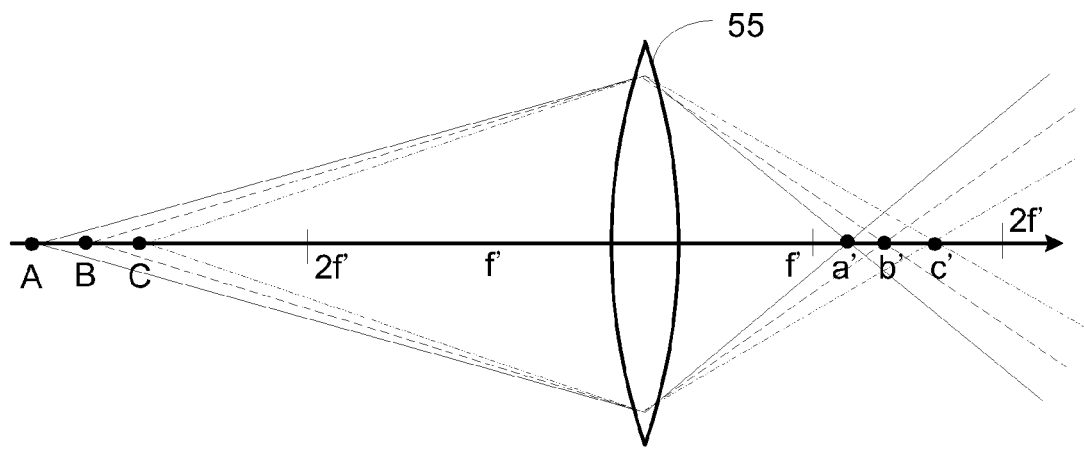

FIG. 5A and FIG. 5B show relations between a focal length of a capturing lens and bokeh. Generally speaking, a capturing lens having different focal lengths support different functions. For example, a telephoto lens has a longer focal length, a wide-angle capturing lens has a shorter focal length, and a standard capturing lens has a focal length between those of a telephoto lens and a wide-angle capturing lens. As shown in FIG. 5A, a capturing lens 53 has a focal length f; images of three objects A, B and C beyond twice of the focal length (2f) at a first side of the capturing lens 53 are formed at positions a, b and c between one focal length f (f) and twice of the focal length (2f) at a second side of the capturing lens 53. Assuming that the object B is a focal object, therefore an optical sensor is located at the position b, and the object A first focuses before reaching the optical sensor and then diffuses onto the optical sensor, and, the object C directly projects on the optical sensor. It is apparent that the objects A and C both form bokeh on the optical sensor.

Referring to FIG. 5B, respective distances between the objects A, B and C and the capturing lens 55 are the same as those in FIG. 5A. The capturing lens 55 has a focal length f', which is greater than the focal length f of the capturing lens in FIG. 5A. Images of the three objects A, B and C beyond twice of the focal length (2f') at a first side of the capturing lens 55 are formed at positions a', b' and c' between one focal length (f') and twice of the focal length (2f') at a second side of the capturing lens 55. Assuming that the object B is a focal object, an optical sensor is located at the position b', the object A first focuses and then diffuses onto the optical sensor, and the object C directly projects on the optical sensor. Similarly, both the objects A and C form bokeh on the optical sensor.

By comparing FIG. 5A with 5B, it is deduced that a diffusion area of bokeh caused by the capturing lens 53 having the smaller focal length is smaller, and a diffusion area of bokeh caused by the capturing lens 55 having the greater focal length is larger. Further, since the diffusion area of the bokeh caused by the capturing lens 53 having the smaller focal length is not noticeably large, it is commonly acknowledged that the capturing lens 53 lens has a greater field of depth.

It is demonstrated by the above descriptions that, a diffusion area of a bokeh image is associated with a position of a focal length as well as various optical parameters (e.g., a focal length, an aperture size and a shape (an aperture value and a blade number of an aperture) of a capturing lens). Therefore, to simulate an original image captured by a common camera into a simulated image having layers of another camera, the present invention first confirms relative distances between objects in the original image to serve as distance references for simulating an image captured by another camera. Through the above principle, bokeh of an image formed from other out-of-focus objects can be obtained to further generate a simulated image that appears more similar to the above image captured by another camera.

According to an embodiment of the present invention, distance relations between objects in an image and a capturing lens are obtained as distance relations between objects and a capturing lens to be simulated. The distance relations between the objects in the image and the capturing lens may be confirmed by a three-dimensional (3D) depth. Details of the 3D depth are described below.

Figure 6A:
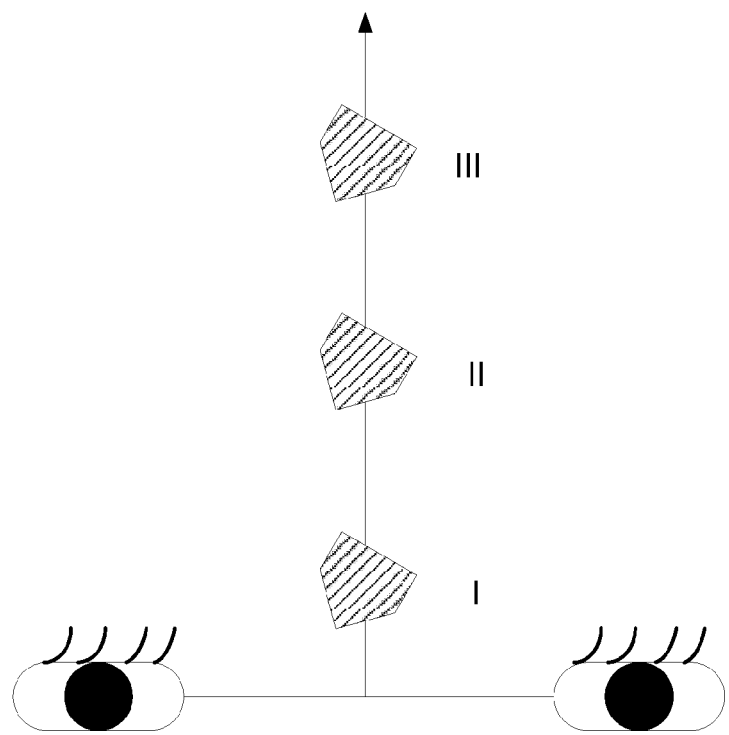
FIGS. 6A and 6B are schematic diagrams of image formation of respective eyes when an object is perceived by the both eyes.
Figure 6B:
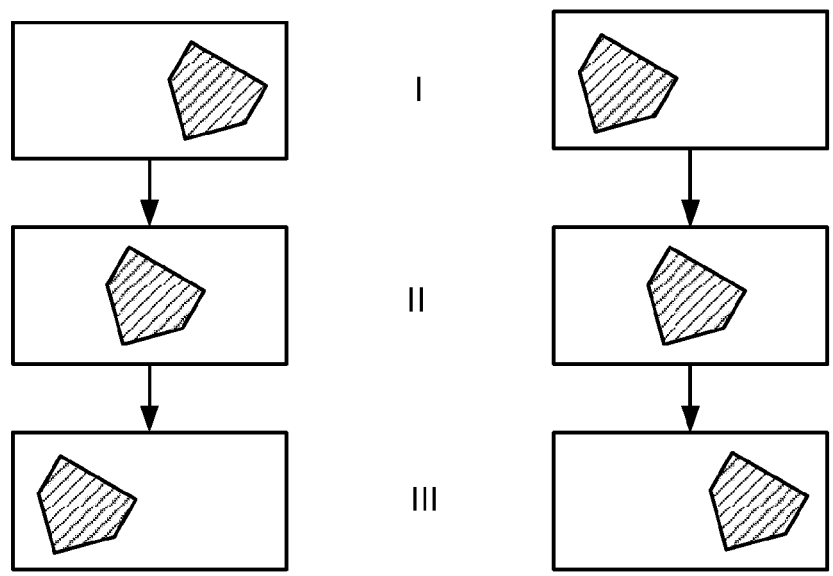

When a pair of human eyes look at one object, the right eye and the left eye perceive slightly different images to the object, and the human brain then establishes a 3D image according to the images perceived by the both eyes. FIGS. 6A and 6B show schematic diagrams of image formation of respective eyes when an object is perceived by both eyes.

Referring to FIG. 6B, when the object is at a position "II", the images perceived by the left and right eyes are identical, i.e., the objects in the left-eye and right-eye images are at the center of the images (i.e., these two images are overlapped completely). In this example, the 3D depth is set as zero. Basis for setting the 3D depth may vary according to actual requirements, given that the 3D depth is in principle for simulating possible real relative distances among objects of a 3D image. When the object gradually moves to a position "I" right in front of the eyes, the object perceived by the left eye is located at the right side of the left-eye visual range, and the object perceived by the right eye is located at the left side of the right-eye visual range. At this point, the distance between the same object in the two images increases, inferring that the 3D depth increases towards a negative direction (if distances between the object and the both eyes are used as references). When the object gradually moves away from the both eyes to a position "III", the object perceived by the left eye is at the left side of the left-eye visual range, and the object perceived by the right eye is at the right side of the right-eye visual range. The 3D depth increases towards a positive direction at this point.

Figure 7A:
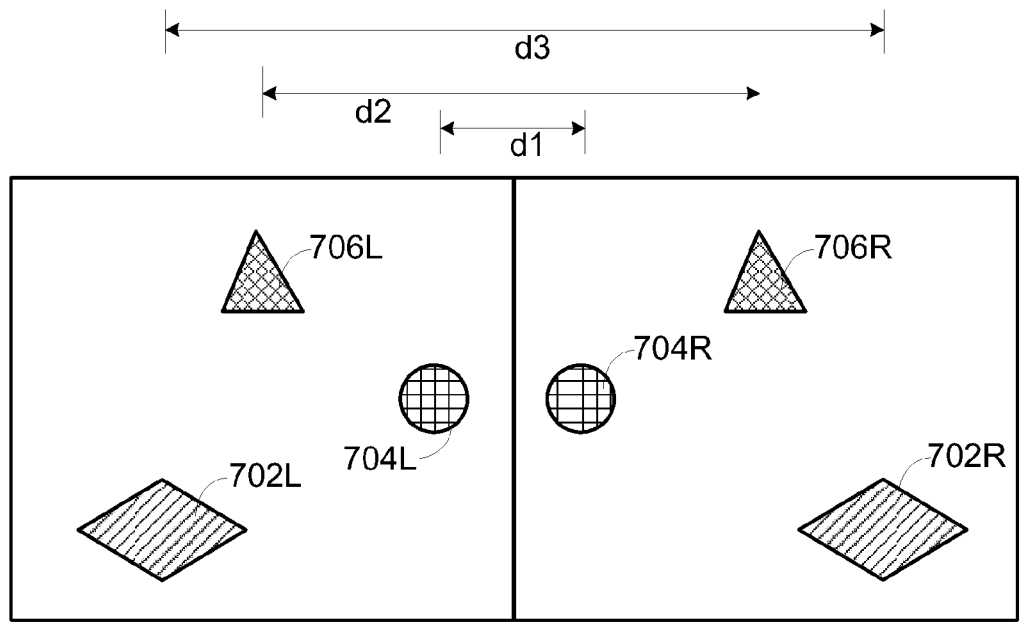
FIGS. 7A and 7B show details for determining an object position and for calculating a 3D depth according to images simultaneously perceived by the both eyes.
Figure 7B:
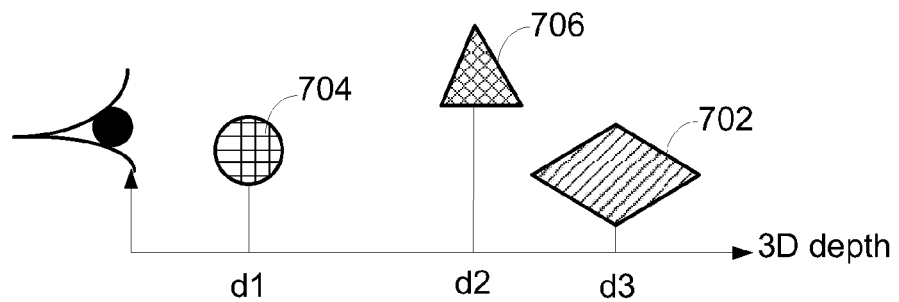

FIGS. 7A and 7B show details for determining an object position and for calculating a 3D depth according to images simultaneously perceived by both eyes. Assume that in the left-eye visual range perceived by the left eye, a rhombus 702L is at the left, a circle 704L is at the right, and a triangle 706L is in the middle between the rhombus 702L and the circle 704L. Also assume that in the right-eye visual range perceived by the right eye, a rhombus 702R is at the right, a circle 704R is at the left, and a triangle 706R is in the middle between the rhombus 702R and the circle 704R.

In an embodiment, assuming that a left-eye image is defined as a reference image, a horizontal displacement between the circle 704L in the left-eye image and the circle 704R in the right-eye image is a negative value, a horizontal displacement between the triangles 706L and 706R is 0, and the horizontal displacement between the rhombuses 702L and 702R is a positive value. The 3D depth is directly proportional to the values of the horizontal distances. Therefore, in this example, the 3D depth of the triangle 706 is 0, the 3D depth of the circle 704 is a negative value, and the 3D depth of the triangle 706 is a positive value. The 3D depth is indicative of a distance between the object and the eyes (lens).

In another example, the 3D depth may be indicative of a displacement between the same object in the left-eye and right-eye images, i.e., d1, d2 and d3 in FIG. 7A, and distances between the object and the eyes (lens) can be obtained according to d1, d2 and d3. In short, the 3D depth obtained according to the above concept is ultimately utilized for obtaining a distance between an object and a lens. It should be noted that definitions of the 3D depth are not to be construed as limitations to the present invention.

Hence, the distance relations between objects in an original image and a lens to be simulated in the present invention can be obtained through the concept of the 3D depth. With the 3D depth, objects in an original image are in equivalence materialized to create distances between the objects and the lens (e.g., eyes), so as to simulate an image of a physical scene captured by a camera.

Various approaches are available for respectively obtaining the 3D depth of the objects in an image. For example, a camera having two capturing lenses can be utilized to capture a same scene. Apart from the desired original image, an auxiliary image similar to the original image can be additionally obtained. According to the original image and the auxiliary image captured by the two capturing lenses, the 3D depth of all the objects in the original image can be calculated to accordingly determine distances between all the objects and the lens to be simulated.

Alternatively, a single capturing lens may be utilized to obtain two images of the same scene by moving left and right, and the 3D depth of all the objects in the original image can be accordingly deduced to serve as references for distances between all the objects and the lens to be simulated. Further, apart from using the 3D depth, in other embodiments, the distances between the objects and the lens to be simulated may also be obtained through other approaches. In an embodiment, a distance detecting unit (e.g., an infrared distance detection unit) is implemented, and infrared beams are transmitted to all the objects to accordingly obtain the distances between the objects and the detecting unit. The detecting unit may be disposed in a camera. Alternatively, the same lens may be utilized to capture multiple consecutive images at a fast speed by adjusting the focal point, and the distances between the objects and the capturing lens can be obtained according to the focal positions and clarities of the objects in the image. Alternatively, based on refraction differences of optical waves of different colors passing through a lens, e.g., minute differences of three colors namely R, G and B passing through the focal point of the lens, the distances can be determined according to the clarities of the R, G and B images. Alternatively, according to a rule of thumb, e.g., a closer object appears to be larger and a farther object appears to be smaller, or overlapping objects, connections of all the objects can be learned to estimate the distances between all the objects and the capturing lens.

After capturing an original image with a common camera and obtaining distances between all objects in the original image and a capturing lens, an object in the image is selected as a focal object, and lens parameters as well as an aperture size (aperture value) of a lens to be simulated are selected. The original image may then be edited according to characteristics of the lens to be simulated. Further, a focusing distance, instead of being obtained through calculations according to the 3D depth, can be obtained from existing associated information captured from an exchangeable image file format (EXIF) of the original image or can be directly provided by an auto-focusing module of the camera.

FIG. 8 shows details of editing an original image according to a first embodiment of the present invention. Assume that the original image includes an object Y and an object Z, the object Y is located at a distance Dy from a capturing lens to be simulated 83, and the object Z is located a distance Dz from a capturing lens to be simulated 83. The object Y is selected as a focal object, and a size of an aperture 85 is a circle having a diameter d.

When the focal length of the lens to be simulated is F, according to the Lensmaker's equation, a distance between the image formation position of the object Z and the lens to be simulated 83 is Iz, and a distance between the image formation position of the object Y and the lens to be simulated 83 is Iy.

An optical sensor is at a position located by a distance Iy from the focal point since the object Y is the focal object. At this point, the diameter of the bokeh generated by the object Z is: $Bx=d(Iy-Iz)/Iz$. In other words, Bx is a diffusing diameter of the object Z on the optical sensor (assuming the image formation area is circular). Based on the law of conservation of energy, a blur process is performed on the object Z according to the diffusing diameter Bx to form a blurred object Z having the diffusing diameter Bx. A simulated image is then generated by combining the object Y and the blurred object Z.

Apart from directly calculating the diffusing diameter, various lenses to be simulated may also first be directly measured to obtain blur parameters of the lenses to be simulated. A blur matrix in the blur parameters of the lenses to be simulated is then obtained through a look-up table to simulate the bokeh.

A method for establishing a blur parameter of one lens to be simulated is explained in the description below. The same method may also be implemented to establish blurry parameters of other lenses to be simulated. Assume that a camera provides three aperture values to select from, and each of the aperture values needs to undergo a measuring process below.

For a first aperture value (M1), a first focusing distance (N1) between an object and a lens to be simulated is selected, and an imaging position of a focal object on an optical sensor is confirmed. A point light source is moved from far to near to sequentially change a distance between the point light source and the lens to be simulated.

Each time the point light source moves, a brightness distribution and a shape of an out-of-focus formed image on the optical sensor corresponding to optical parameters, such as a current distance, an aperture value and a focal length, may be recorded as a blur matrix. Given that the optical parameters such as the aperture value and the focal length remain unchanged, a blur matrix set may be concluded from the blur matrices corresponding to different distances. Each of the blur matrices can be fundamentally regarded as a filter, and the simulated image can be generated from objects in the original image according to the corresponding filters.

Next, different focal lengths are adopted while other conditions remain unchanged, another blur matrix set can be obtained after repeating the above method. Similarly, by repeating the above method using different apertures, different blur matrix sets can be obtained. In other words, by setting the lens to different optical parameters such as different focal lengths, different aperture values or different shutters, different corresponding blur matrix sets can be obtained. That is also to say, same combinations of optical parameters such as the same focal lengths, aperture values and shutters correspond to the same blur matrix sets. Accordingly, after setting the object to be focused in the original image to be simulated (under a predetermined aperture value), a simulated distance of the object (or a sampled object) in the original image can be identified, and the simulated image can be generated by converting each of the pixels in the original image through the corresponding blur matrix.

FIGS. 9A to 9D show schematic diagrams of changes in a diffusion level of an out-of-focus formed image on an optical sensor due to a point light source moving from far to near. Distances between the point light source and a lens to be simulated are sequentially O1, O3, O3 and O4, where O1>O2>O3>O4.

When the distance between the point light source and the lens to be simulated is O1, the out-of-focus formed image projected on the optical sensor is shown in FIG. 9A, with numbers in the diagram representing light intensity distribution ratios. By normalizing the light intensity distribution ratios on the optical sensor, a blur matrix is obtained as:

$$H_{M1-N1-O1} = \frac{1}{41}\begin{bmatrix} 0 & 1 & 2 & 1 & 0 \\ 1 & 2 & 3 & 2 & 1 \\ 2 & 3 & 5 & 3 & 2 \\ 1 & 2 & 3 & 2 & 1 \\ 0 & 1 & 2 & 1 & 0 \end{bmatrix}$$

When the distance between the point light source and the lens to be simulated is O2, the out-of-focus formed image projected on the optical sensor is shown in FIG. 9B. By normalizing the light intensity distribution ratios on the optical sensor, a blur matrix is obtained:

$$H_{M1-N1-O2} = \frac{1}{25}\begin{bmatrix} 0 & 0 & 1 & 0 & 0 \\ 0 & 2 & 2 & 2 & 0 \\ 1 & 2 & 5 & 2 & 1 \\ 0 & 2 & 2 & 2 & 0 \\ 0 & 0 & 1 & 0 & 0 \end{bmatrix}$$

When the distance between the point light source and the lens to be simulated is O3, the out-of-focus formed image projected on the optical sensor is shown in FIG. 9C. By normalizing the light intensity distribution ratios on the optical sensor, a blur matrix is obtained:

$$H_{M1-N1-O3} = \frac{1}{17}\begin{bmatrix} 0 & 0 & 0 & 0 & 0 \\ 0 & 1 & 2 & 1 & 0 \\ 0 & 2 & 5 & 2 & 0 \\ 0 & 1 & 2 & 1 & 0 \\ 0 & 0 & 0 & 0 & 0 \end{bmatrix}$$

When the distance between the point light source and the lens to be simulated is O4, the out-of-focus formed image projected on the optical sensor is shown in FIG. 9D. By normalizing the light intensity distribution ratios on the optical sensor, a blur matrix is obtained:

$$H_{M1-N1-O4} = \frac{1}{9}\begin{bmatrix} 0 & 0 & 0 & 0 & 0 \\ 0 & 0 & 1 & 0 & 0 \\ 0 & 1 & 5 & 1 & 0 \\ 0 & 0 & 1 & 0 & 0 \\ 0 & 0 & 0 & 0 & 0 \end{bmatrix}$$

After the first aperture value (M1) and the first focusing distance (N1) between the focal object and the lens to be simulated are selected, a blur matrix set can be formed by multiple blur matrices obtained from moving the point light source multiple times to different positions. It is known from descriptions associated with FIGS. 9A to 9D that, in this embodiment, under conditions of the first aperture value (M1) and the first focusing distance (N1) between the focal object and the lens to be simulated, the blur matrix set includes four matrix sets $H_{M1-N1-O1}$, $H_{M1-N1-O2}$, $H_{M1-N1-O3}$ and $H_{M1-N1-O4}$. It should be noted that the number of blur matrices in a blur matrix set is not limited to a specific number. In other words, in the method of present embodiment, the point light source can be moved for more times to obtain more blur matrices. Alternatively, for example, a larger number of blur matrices may also be obtained mathematically through interpolation.

After obtaining one blur matrix set, the first aperture value is maintained the same and the focusing distance between the object and the lens to be simulated is updated to a second focusing distance (N2) to continue in establishing a next blur matrix set. Alternatively, the first focusing distance (N1) is maintained the same and the aperture value is changed to a second aperture value (M2) to continue in establishing another blur matrix set.

After updating the focusing distance of the lens to be simulated for a number of times and updating the aperture value for a number of times, multiple blur matrix sets obtained may be regarded as blur parameters of the lens to be simulated. Similarly, the same approach may be employed to obtain blur parameters of all other lenses to be simulated. Alternatively, the lens blur parameters may be provided to a user by a manufacturer of the lens, or measured by a user.

Figure 10:
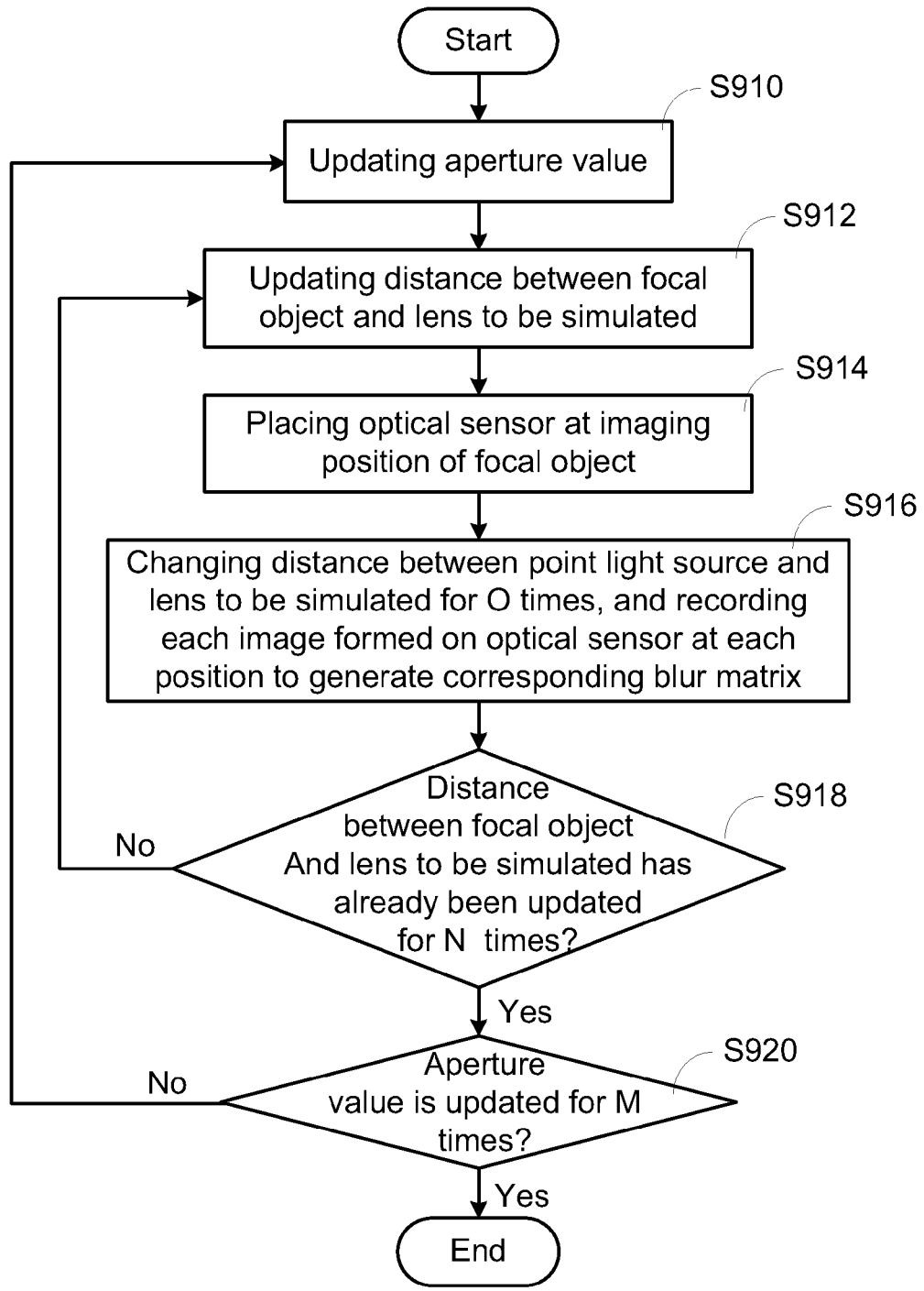
FIG. 10 is a flowchart of a method for establishing a lens blur parameter of a lens to be simulated according to an embodiment of the present invention.

FIG. 10 shows a method for establishing a blur parameter of a lens to be simulated according to an embodiment of the present invention. In Step S910, an aperture value is updated. In Step S912, a distance between a focal object and the lens to be simulated is updated. In Step S914, an optical sensor is placed at an imaging position corresponding to the focal object. In Step S916, a distance between a point light source and the lens to be simulated is updated for 'O' number of times, and each image formed on the optical sensor corresponding to each position is recorded to accordingly generate a corresponding blur matrix. In Step S918, it is determined whether the distance between the focal object and the lens to be simulated has already been updated for N number of times. If a result of Step S918 is negative, Step S912 is iterated, or else Step S920 is performed. In Step S920, it is determined whether the aperture value is updated for M number of times. Step S910 is iterated when a result of Step S920 is negative, or else the process ends when the result of Step S920 is affirmative.

It is apparent that after completing the process in FIG. 10, M×N blur matrix sets are available as lens blur parameters of the lens to be simulated, with each of the blur matrix sets including O number of blur matrices.

Figure 11A:
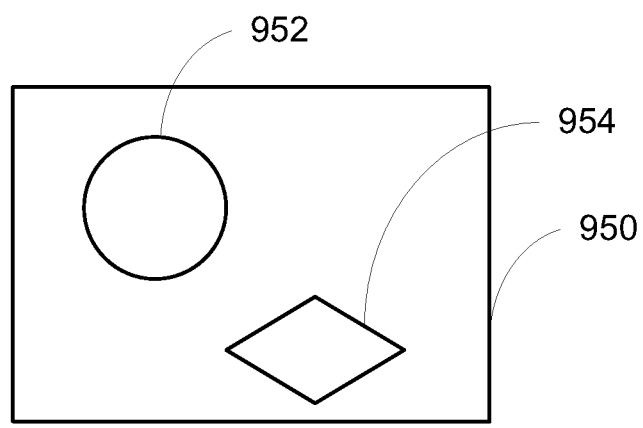
FIGS. 11A and 11B are schematic diagrams of image simulation according to an embodiment of the present invention.
Figure 11B:
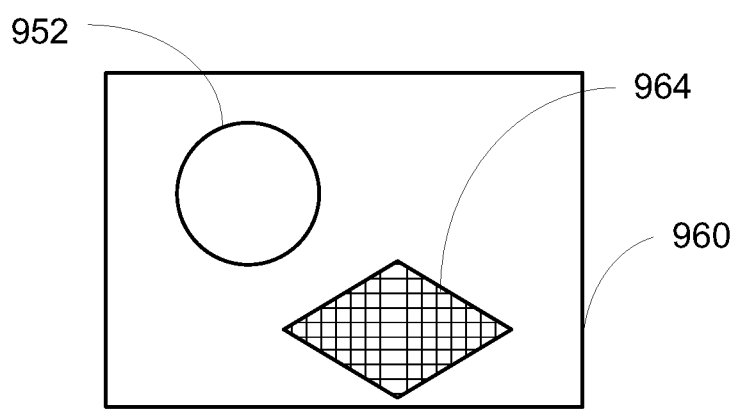

The image editing method of the present invention may be performed when the lens blur parameters are established. FIGS. 11A and 11B show schematic diagrams of image simulation according to an embodiment of the present invention. FIG. 11A shows an original image 950 including a circle 952 and a rhombus 954. The original image 950 is to be simulated into a simulated image 960 captured by a lens to be simulated L.

The circle 952 is selected as a focal object, and a focusing distance (first distance) between the object 952 and the lens to be simulated L is estimated. A 3D depth of the circle 952 in the original image 950 or a distance between the circle 952 and the lens is first obtained (by the above approach or retrieved) to accordingly determine the simulated focusing distance between the object 952 and the lens to be simulated L. Based on the known lens blur parameters (e.g., obtained by the above approach) of the lens to be simulated L, a blur matrix set can be determined from the lens blur parameters according to an aperture value (and/or a focal length) and the first distance in the simulation method of the present invention. Next, a corresponding blur matrix can be obtained from the blur matrix set according to the second distance.

A blur process is then performed on the rhombus 954 according to the blur matrix to form a blurred rhombus 964, and the simulated image 960 is generated by combining the circle 952 and the blurred rhombus 964.

According to the embodiment of the present invention, all pixels forming the rhombus 964 in the original image 950 are respectively regarded as a point light source. Diffusion results of the point light sources processed by the blur matrix are superimposed to form the blurred rhombus 964.

As previously described, the simulated image 960 can be generated by combining the circle 952 and the blurred rhombus 964, and may be regarded as an image captured by the lens to be simulated.

Figure 12:
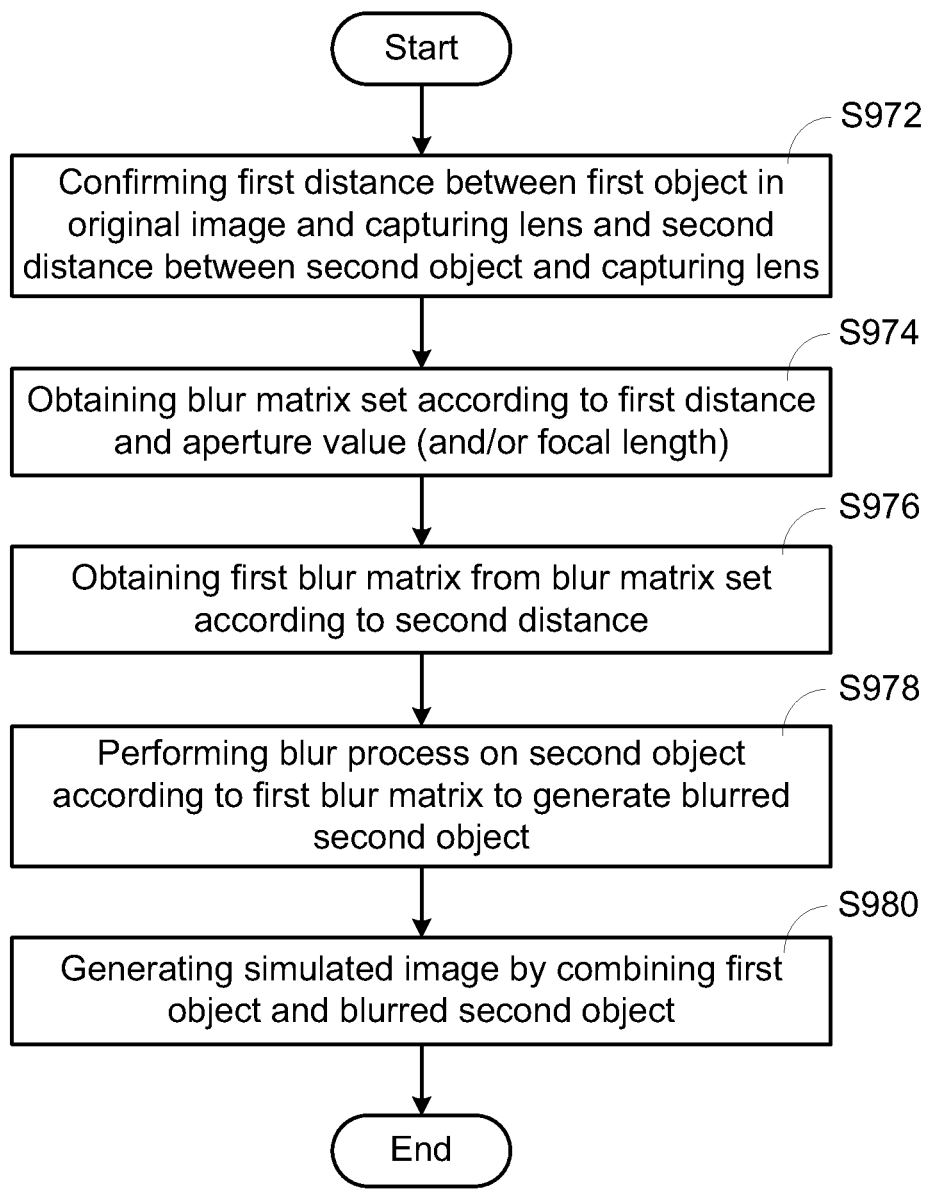
FIG. 12 shows an image editing method according to an embodiment of the present invention.

FIG. 12 shows an image editing method according to an embodiment of the present invention. In Step S972, a first distance between a first object in an original image and a capturing lens and a second distance between a second object and the capturing lens are confirmed. In Step S974, a blur matrix set is obtained according to the first distance and an aperture value (and/or a focal length). In Step 976, a first blur matrix is obtained from the blur matrix set according to the second distance. In Step S978, a blur process is performed on the second object according to the first blur matrix to generate a blurred second object. In Step S980, the first object and the blurred second object are combined to generate the simulated image.

In the descriptions above, a blur process performed on the rhombus 964 is given as an example. However, all pixels other than the focal object (the circle 952) in the original image may be regarded as point light sources. After obtaining the distances between all the point light sources and the capturing lens, corresponding blur matrices can be obtained from the blur matrix set according to the different distances to further perform the blur process. Diffusion results of all the point light sources are superimposed and then combined with the focal object (circle 952) to generate the final simulated image 960.

Further, the image simulating method according to an embodiment of the present invention includes generating an output corresponding to a change in a distance between an object and a lens, generating different outputs corresponding to changes in a relative distance between the object and a focal point of the lens, or changing an output according to a change in an aperture value or a focal point of the lens. Thus, an original image may be converted into a simulated image satisfying the above optical characteristics of the lens through different conversion characteristics. For example, the above embodiment of the present invention is applicable to a photographing device (e.g., a camera) or in a computer system as a tool for post-processing photographs.

In conclusion, according to distances between objects in an original image and a capturing lens, a method is provided by the present invention for editing and simulating an original image into an image captured by a lens of a simulated camera.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image editing method, for editing an original image comprising at least a first object and a second object, the method comprising:
    obtaining a first distance between the first object and a lens;
    obtaining a second distance between the second object and the lens;
    obtaining a blur matrix set according to the first distance and an optical parameter;
    obtaining a first blur matrix from the blur matrix set according to the second distance; and
    performing a blur process on the second object according to the first blur matrix to generate a blurred second object, and generating a simulated image from the first object and the blurred second object.

2. The method according to claim 1, wherein at least one of the first distance and the second distance is obtained by a three-dimensional (3D) depth measuring method.

3. The method according to claim 2, wherein the 3D depth measuring method further comprises an auxiliary image associated with the original image, and the first object or the second object in the original image is compared with the first or second object in the auxiliary image to calculate the first distance or the second distance.

4. The method according to claim 3, wherein the auxiliary image is captured by the capturing lens or an auxiliary lens.

5. The method according to claim 1, wherein at least one of the first distance and the second distance is provided by a distance detecting unit.

6. The method according to claim 1, wherein at least one of the first distance and the second distance is obtained from consecutive images captured in a focal point adjusting process of the capturing lens.

7. The method according to claim 1, wherein at least one of the first distance and the second distance is retrieved from the original image.

8. The method according to claim 1, wherein the optical parameter is an aperture value or a focal length, and the blur matrix set is obtained from a lens blur parameter of a lens according to the first distance and at least one of the focal length and the aperture value.

9. The method according to claim 8, comprising establishing the lens blur parameter, comprising:
    a) positioning a first object and a second object at different positions in front of the lens;
    b) focusing on the first object with a focusing distance between the lens and the first object;
    c) changing the position of the second object for a plurality of times, and recording each image diffusion level of the second object at each of the positions to obtain a blur matrix;
    d) moving the first object and re-focusing on the first object with another focusing distance, and repeating step (c); and
    e) repeating step (d) for a plurality of times to obtain a plurality of blur matrix sets corresponding to different focusing distances, wherein each of the blur matrix sets comprises a plurality of blur matrices.

10. The method according to claim 9, wherein establishing the lens blur parameter further comprises:
    f) changing the aperture value and repeating steps (c) to (e).

11. The method according to claim 10, wherein establishing the lens blur parameter further comprises:
    changing the focal length and repeating steps (c) to (f).

12. The method according to claim 9, wherein establishing the lens blur parameter further comprises:
    changing the focal length and repeating steps (c) to (e).

13. The method according to claim 1, wherein the step of obtaining the first distance and the second distance comprises:
    assigning the first distance with an arbitrary value; and
    generating the second distance according to a rule of thumb.

14. The method according to claim 1, wherein the step of obtaining the first distance and the second distance comprises:

assigning the first distance with an arbitrary value; and generating the second distance by a distance detecting method.

15. The method according to claim 1, wherein the blur matrix set is implemented by a filter.

16. The method according to claim 1, wherein the optical parameter is an aperture value or a focal length, and the blur matrix set is obtained according to the first distance and at least one of the aperture value and the focal length.

17. A method for establishing a blur parameter, the blur parameter adapted for converting an original image to a blurred image to conform to an optical characteristic of a lens, the method comprising:

a) positioning a first object and a second object at different positions in front of the lens;

b) focusing on the first object with a focusing distance between the lens and the first object;

c) changing the position of the second object for a plurality of times, and recording each image diffusion level of the second object at each of the positions to obtain a blur matrix;

d) moving the first object and re-focusing on the first object with another focusing distance, and repeating step (c); and e) repeating step (d) for a plurality of times to obtain a plurality of blur matrix sets corresponding to different focusing distances, wherein each of the blur matrix sets comprises a plurality of blur matrices.

18. The method according to 17, further comprising:

f) changing an aperture value and repeating steps (c) to (e).

19. The method according to claim 18, further comprising: changing a focal length of the lens and repeating steps (c) to (f).

20. The method according to claim 17, further comprising: changing a focal length of the lens and repeating steps (c) to (e).

* * * * *